Patented Dec. 25, 1951

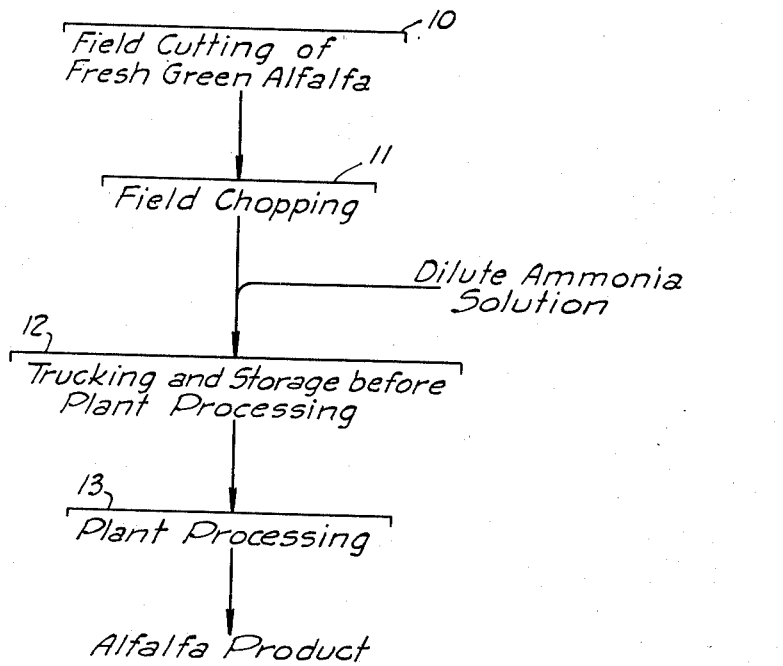

2,579,609

UNITED STATES PATENT OFFICE 2,579,609

VEGETABLE TREATMENT PROCESS

David D. Peebles, Hillsborough, Paul D. Clary, Jr., Petaluma, and Richard K. Meade, Santa Rosa, Calif., assignors to Western Condensing Company, San Francisco, Calif., a corporation of California Application February 14, 1949, Serial No. 76,212

7 Claims. (Cl. 99—8)

This invention relates generally to processes for the treatment of various fresh vegetable materials, particularly the green leafy portions of succulent plants such as alfalfa, grasses, beet tops and the like.

The leafy portions of succulent vegetables like alfalfa contain a substantial amount of carotin, and it is recognized that the food value of products made from such materials is dependent to a substantial degree upon the residual carotin content. It has been observed that immediately after cutting or mowing a fresh vegetable in the field, the carotin content commences to deteriorate. When such a material is brought to a processing plant and dried by conventional methods, the carotin content at the commencement of processing shows substantial deterioration over the original material, and during processing further deterioration occurs until in a typical instance the carotin content immediately after processing will be of the order of 65% of the original amount present.

The present invention is predicated upon our discovery that ammonia, when applied as a dilute aqueous solution to the fresh cut material, has a remarkable effect in preventing deterioration of the carotin content. According to the present invention dilute aqueous ammonia solution is sprayed upon the leafy material immediately after field cutting, thereby greatly minimizing deterioration of the vitamin content between the time of field cutting and processing in the plant. We have also found that this treatment tends to minimize deterioration of carotin during at least the preliminary phases of plant processing, thereby aiding in securing a relatively high percentage of carotin in the final processed product or products.

Additional objects and additional details of the invention will appear from the following description in which the preferred embodiment has been set forth in detail in conjunction with the flow sheet of the accompanying drawing.

The flow sheet of the accompanying drawing assumes that the process is to be practiced upon fresh green alfalfa, which is to be plant processed to produce one or more marketable products. Step 10 represents the cutting of fresh green alfalfa in the field by use of conventional cutting or harvesting equipment. It is assumed that the equipment used includes apparatus for the field chopping of the cut alfalfa, as indicated by step 11. The chopping can be carried out to cut the alfalfa into fragments of convenient size for plant processing. It is conventional practice to pneumatically convey the chopped alfalfa from the chopping apparatus to the hopper of a motor truck for transportation to the processing plant. Such trucking, together with storage of the material before plant processing, is indicated by step 12. As the material passes to step 12 it is contacted or surface wetted with a dilute ammonia solution as indicated. This solution can be conveniently applied by spraying it into the stream of chopped material as it is being pneumatically conveyed or blown to the truck.

Assuming that there is no storage between operations 10 and 11, it will be evident that the dilute ammonia solution is applied to the alfalfa immediately after field cutting. However several hours may elapse during trucking and storage, before the plant processing indicated by step 13. It is during this period of time that the ammonia serves to inhibit deterioration of the carotin content.

The plant processing indicated by step 13 may vary in different instances, depending upon the product or products desired. In a typical instance the drying consists in passing the chopped material through a conventional dryer of the tunnel or rotating drum type, where it is contacted with hot air. The final dried alfalfa resulting from such conventional drying may contain for example about 4% moisture. If desired this dried material can be further ground to produce a dried alfalfa meal. In other types of processing alfalfa can be subjected to juice expelling operations, with separate processing of the juice and expressed fiber to produce marketable products.

Because of the relatively small amount of ammonia required it is satisfactory to use a relatively dilute aqueous ammonia solution, such as one containing 2% (by weight) of ammonia in water. For example satisfactory results are secured by using 200 lbs. of a 2% aqueous ammonia solution for each ton of green chopped alfalfa.

In general the amount of dilute ammonia solution employed should be sufficient to produce a substantial wetting of the leaves and stem portions of the alfalfa, without applying such an excess as to result in a substantial amount of drainage of liquid from the mass. As previously stated a 2% ammonia solution has given good results, although in some instances it is desirable to use more concentrated solutions, as for example say 3% or even 4%.

The average hydrogen ion concentration of the chopped material after application of the dilute ammonia solution is definitely on the alkaline side and should be at least about pH 7.5. In actual practice it is desirable that the concentration of the solution be such as to produce an average hydrogen ion concentration of the order of pH 8. In order to determine the average hydrogen ion concentration of the chopped material, after application of the dilute ammonia solution, some of the material is placed in a suitable container and crushed with a small amount of water, after which the hydrogen ion concentration of the resulting solution is measured.

The process is not highly critical with respect to the hydrogen ion concentration, and good results have been secured with hydrogen ion concentrations in the range of from pH 7.5 to 8.5. If in actual practice a check of the hydrogen ion concentration during a day's operation shows that it is substantially greater than pH 8, then it is desirable to increase the concentration of the dilute ammonia solution to say 3 or 4% from the initial 2%, until the desired pH value is restored.

It has been observed that under various conditions and with different stands of alfalfa, some variation in the concentration of the dilute solution is required in order to produce a hydrogen ion concentration of pH 8. Thus for operations at various times during a working day, the hydrogen ion concentration may tend to vary if the same concentration of dilute ammonia solution is employed. Generally as a working day proceeds it is desirable to progressively increase the strength of the ammonia solution from say 2% in the early morning to say 3 or even 4% during the day, in order to maintain the hydrogen concentration constant and at the desired value of about pH 8.

It is desirable and economical to prepare the dilute ammonia solution by the dilution of commercial aqua-ammonia with water. It is possible however to prepare the solution by the dissolution of ammonia gas in water to produce a suitable dilute solution. Also aqueous solutions of ammonia forming compounds, such as ammonium chloride, and ammonium sulphate can be reacted with caustic solutions such as a solution of sodium hydroxide. If desired intermixture and reaction of the two solutions, in order to form ammonium hydroxide, may be carried out simultaneously with application of the solution as a spray to the chopped material.

Examples of actual practice are as follows:

*Example I*

Alfalfa freshly mowed and chopped in the field contained 30 mgs. per 100 gms. dry solids of carotin. This material was sprayed with a 2% solution of ammonium hydroxide, the amount of solution employed corresponding to 1200 lbs. of solution per 10,000 lbs. of freshly chopped material. It was then transported by truck to a processing plant, there being a lapse of two hours between the time of mowing and commencement of plant processing. The treated material then contained 30 mgs. per 100 gms. dry solids of carotin, in contrast with 25 mgs. per 100 gms. dry solids for a control sample which had been separately stored for the same period. Both the treated material and the control sample were then plant processed by drying in contact with air at a temperature of 800° F. The part treated with ammonium hydroxide solution was then found to contain 28 mgs. per 100 gms. dry solids of carotin, in contrast with 20 mgs. per 100 gms. dry solids of carotin for the dried control sample.

*Example II*

Alfalfa fresh mowed and chopped in the field contained 30 mgs. per 100 gms. dry solids of carotin. It was again sprayed with a 2% solution of ammonium hydroxide in the same amount as set forth in the first example. The treated material, together with a control sample, was then stored for a period of two hours as in Example I. The two parts were then separately treated in a mechanical expeller to press out a substantial amount of the juice. The juice of the treated material contained 29 mgs. per 100 gms. dry solids of carotin, and the press cake separated from the juice contained 28 mgs. per 100 gms. dry solids of carotin. The juice obtained from the control sample analyzed 20 mgs. per 100 gms. dry solids and the press cake solids 18 mgs. per 100 gms. dry solids. Upon drying the separated press cake by contact with drying air at a temperature of 800° F., to produce a dried material containing 4% moisture, the solids from the treated part analyzed 27 mgs. per 100 gms. dry solids of carotin, in contrast with 16 mgs. per 100 gms. dry solids of carotin from the control sample. The juices from the two parts analyzed 27 mgs. per 100 gms. dry solids and 16 mgs. per 100 gms. dry solids respectively for the two parts. The two liquid fractions from the two parts were separately concentrated by vacuum evaporation, and after acidulation to pH 5.5, they were spray dried to form powdered products containing about 6% moisture. The powdered material from the treated part contained 27 mgs. per 100 gms. dry solids of carotin, in contrast with 16 mgs. per 100 gms. dry solids for the control sample.

In the first of the above two examples the over-all yield of carotin was about 93.5% for the treated part, in contrast with 67% for the untreated part. In the second example the over-all yield of carotin for the treated part was 90%, in contrast with 53.5% yield for the untreated part.

It will be evident from the foregoing description and examples that our process makes possible a great saving of carotin content in the handling and processing of fresh green vegetable material, such as alfalfa. The ammonia appears to not only preserve the carotin content during the period elapsing from field cutting to plant processing, which in practice may range from say 1 to 6 hours, but in addition during at least the initial stages of plant processing the ammonia continues to exert its inhibiting effect upon deterioration of the carotin content. As shown by the foregoing examples this makes possible the manufacture of marketable products of relatively high carotin content, in contrast with inferior dried products which are produced by conventional processing. The process is economically feasible in that the cost of applying the dilute ammonia solution is relatively small and fully warranted by the saving in carotin content.

In some instances it may not be desirable to chop the material in the field prior to transporting it to the processing plant. In such instances the dilute ammonia solution can be applied directly to the unchopped leaves of the material as harvested, and chopping can be deferred until the commencement of plant processing operations.

We claim:

1. In a process for the treatment of fresh green vegetable material, contacting the material, immediately after the same is cut in the field, with ammonia.

2. In a process for the treatment of fresh green vegetable material, surface wetting the material immediately after cutting the same in the field with a dilute aqueous ammonia solution.

3. A process as in claim 2 in which the dilute aqueous ammonia solution is sprayed upon the material to surface wet the same.

4. In a process for the treatment of fresh green vegetable material, the steps of surface wetting the material with a dilute aqueous ammonia solution, immediately after the material has been cut in the field, and then after a period of storage, plant processing the material to produce a marketable product.

5. A process as in claim 4 in which the plant processing involves a drying of the material.

6. In a process for the treatment of fresh green vegetable material, surface wetting the material immediately after field cutting and chopping of the same, with a dilute aqueous ammonia solution, to produce an average hydrogen ion concentration of not greater than about pH 7.5, and then, after a period of time, subjecting the material to plant processing.

7. In a process for the treatment of fresh green vegetable material, surface wetting freshly field cut green vegetable material having a substantial carotin content with a dilute aqueous ammonia solution, the solution having an ammonia content of the order of from 2 to 4% and serving to provide an average pH for the material with a range of about pH 7.5 to 8.5.

DAVID D. PEEBLES.
PAUL D. CLARY, Jr.
RICHARD K. MEADE.

REFERENCES CITED

The following references are of record in the file of this patent:

UNITED STATES PATENTS

| Number | Name | Date |
| --- | --- | --- |
| 2,293,845 | Millar | Aug. 25, 1942 |
| 2,298,514 | Stauf et al. | Oct. 13, 1942 |
| 2,346,072 | Haskell | Apr. 4, 1944 |
| 2,458,679 | Buxton | Jan. 11, 1949 |
| 2,474,182 | Kephart | June 21, 1949 |